(12) United States Patent
Pegg et al.

(10) Patent No.: US 9,417,764 B2
(45) Date of Patent: Aug. 16, 2016

(54) METHODS AND SYSTEMS FOR DECLUTTERING ICONS REPRESENTING POINTS OF INTEREST ON A MAP

(71) Applicant: MapQuest, Inc., Denver, CO (US)

(72) Inventors: Antony M. Pegg, East Petersburg, PA (US); Joshua J. Babetski, Austin, TX (US); Angela S. Olivero, Longmont, CO (US); Gopakumar Sivanpillai, Tamil Nadu (IN); Anil Mathew, Kerala (IN)

(73) Assignee: MapQuest, Inc., Denver, CO (US)

( * ) Notice: Subject to any disclaimer, the term of this patent is extended or adjusted under 35 U.S.C. 154(b) by 344 days.

(21) Appl. No.: 14/061,090

(22) Filed: Oct. 23, 2013

(65) Prior Publication Data

US 2014/0047366 A1 Feb. 13, 2014

Related U.S. Application Data

(63) Continuation of application No. 12/246,413, filed on Oct. 6, 2008, now Pat. No. 8,671,355.

(60) Provisional application No. 60/978,102, filed on Oct. 5, 2007.

(51) Int. Cl.
*G06F 3/0481* (2013.01)
*G01C 21/36* (2006.01)

(52) U.S. Cl.
CPC ........ *G06F 3/04817* (2013.01); *G01C 21/3682* (2013.01)

(58) Field of Classification Search
None
See application file for complete search history.

(56) References Cited

U.S. PATENT DOCUMENTS

| | | |
|---|---|---|
| 6,181,339 B1 | 1/2001 | deCarmo et al. |
| 6,243,094 B1 | 6/2001 | Sklar |
| 6,405,129 B1 | 6/2002 | Yokota |
| 6,829,533 B2 | 12/2004 | Shitamatsu |
| 6,856,901 B2 | 2/2005 | Han |
| 6,995,778 B2 | 2/2006 | Noble |
| 7,945,627 B1 | 5/2011 | Musat |
| 2002/0065605 A1 | 5/2002 | Yokota |
| 2002/0130906 A1 | 9/2002 | Miyaki |
| 2004/0153238 A1 | 8/2004 | Miyahara |

(Continued)

OTHER PUBLICATIONS

Extended European Search Report for European Application No. 10797641, dated Jun 6, 2012 (5 pages).

(Continued)

*Primary Examiner* — Tuan S Nguyen
(74) *Attorney, Agent, or Firm* — Finnegan, Henderson, Farabow, Garrett & Dunner, LLP

(57) ABSTRACT

Methods and systems are provided for decluttering icons on a map graphically presented on a display. In one implementation, a method is provided for decluttering icons representing points-of-interest on a map, wherein the method includes determining whether icons in a map view are overlapping and grouping the icons which are determined to overlap into at least one icon group. The method may also include repositioning the icons in each icon group into a decluttered icon patterns, wherein repositioning includes repositioning the icons at a predetermined distance from a common focal point. In addition, the method may include adjusting the repositioned icons to a different position in the map view when the repositioned icons overlap. Additionally, or alternatively, the method may include repositioning an icon in at least one decluttered icon pattern to a new position in the map view based on input from a user.

20 Claims, 10 Drawing Sheets

(56) References Cited

U.S. PATENT DOCUMENTS

| | | | |
|---|---|---|---|
| 2004/0225436 | A1 | 11/2004 | Yoshihashi |
| 2004/0243306 | A1 | 12/2004 | Han |
| 2004/0243307 | A1 | 12/2004 | Geelen |
| 2005/0051623 | A1 | 3/2005 | Okuda |
| 2005/0182561 | A1 | 8/2005 | Yamada et al. |
| 2005/0251331 | A1 | 11/2005 | Kreft |
| 2006/0136972 | A1 | 6/2006 | Metzger et al. |
| 2007/0083329 | A1 | 4/2007 | Im |
| 2007/0106468 | A1 | 5/2007 | Eichenbaum |
| 2007/0203645 | A1 | 8/2007 | Dees |
| 2007/0268310 | A1 | 11/2007 | Dolph et al. |
| 2008/0307334 | A1 | 12/2008 | Chaudhri et al. |
| 2009/0110302 | A1 | 4/2009 | Snow |
| 2009/0169060 | A1 | 7/2009 | Faenger et al. |
| 2009/0287546 | A1 | 11/2009 | Gillespie et al. |
| 2010/0211909 | A1 | 8/2010 | Ghanekar et al. |
| 2010/0318573 | A1 | 12/2010 | Yoshikoshi |
| 2011/0010650 | A1 | 1/2011 | Hess et al. |

OTHER PUBLICATIONS

Office Action for U.S. Appl. No. 12/458,376, dated Jun. 25, 2013 (10 pages).

Office Action for U.S. Appl. No. 12/458,376, dated Dec. 4, 2012 (10 pages).

Office Action for U.S. Appl. No. 12/458,356, dated Jul. 9, 2012 (8 pages).

Office Action for U.S. Appl. No. 12/458,376, dated Dec. 20, 2011 (7 pages).

Burigat et al., *Decluttering of Icons Based on Aggregation in Mobile Maps*, HCI Lab, Department of Math and Computer Science, University of Udine, Italy (Mar. 2008) (21 pages).

St John et al., *Evaluating Alternative Symbologies for Decluttering Geographical Displays*, Technical Report, Pacific Science and Engineering Group, Inc. (Aug. 2002).

International Search Report in PCT/US10/40716, mailed Aug. 18, 2010 (17 pages).

Stephen K. Hess et al., U.S. Appl No. 12/458,376 for "Systems and Methods for Decluttering Electronic Map Displays," filed Jul. 9, 2009.

http://chicago.everyblock.com/crime/locations.neighborhoods/south-austin/ (with screen shot).

http://ww2.aaa.com/scripts/WebObjects.dll/AAAOnline?association=AAA&club=212&page=ITTServices&target=self (with screen shot).

Judy Lemke, Office Visio 2007 Step by Step, Feb. 14, 2007, Microsoft Press, Chapter 4, p. 99.

Office Action for U.S. Appl. No. 12/458,376, dated Oct. 23, 2014 (11 pages).

Office Action for U.S. Appl. No. 12/458,376, dated Mar. 28, 2014 (10 pages).

Office Action for U.S. Appl. No. 12/458,376, dated Nov. 14, 2013 (10 pages).

METHODS AND SYSTEMS FOR DECLUTTERING ICONS REPRESENTING POINTS OF INTEREST ON A MAP

CROSS REFERENCE TO RELATED APPLICATION(S)

This application is a continuation of U.S. application Ser. No. 12/246,413, filed Oct. 6, 2008, which claims the benefit of priority from U.S. Provisional Application No. 60/978,102, filed Oct. 5, 2007. The disclosures of the above-referenced applications are expressly incorporated herein by reference in their entirety.

BACKGROUND

1. Technical Field

The present invention generally relates to electronic displays and to techniques for graphically representing information on a display. More particularly, and without limitation, the invention relates to methods and systems for decluttering icons representing, for example, points-of-interest on a map, graphically presented on a display.

2. Background Information

We live today in an information rich society. Information is conveyed to users in various formats and through different mediums. By way of example, electronic displays are a common way to convey information to users. Such displays are provided as part of many commercially available devices, such as personal computers, mobile telephones, personal digital assistants, portable navigation devices, and digital media players.

With electrical displays, information is typically conveyed using text and/or graphics. When provided in combination, the text may compliment the graphics, or vice versa. In addition, with certain devices, the text and/or graphics generated on an electrical display may be supplemented with audio signals (e.g., instructions, commands, and/or statements). In such cases, information is conveyed to a user both visually and audibly.

The scope of information that can be conveyed using an electronic display is limitless. Today, many electronic displays have move beyond displaying simple text information to rendering more complex displays, integrating both text and graphics. These complex displays provide a versatile and efficient way to convey information, enabling users to search web sites, as well as receive navigational and/or other information via map displays.

Map displays often convey information concerning roads, walkways, buildings, etc. related to a geographic location. Map displays can also include interactive features that allow users to, for example, zoom, pan, select, and/or search displayed information. In addition, some map displays allow users to select or control the level of information that is conveyed through the display. For example, a user may be permitted to turn on or off the display of certain information, such as street names or a point of interest (POI).

With a map display, the location of a POI may be conveyed to a user through a graphical object, such as an icon. A POI may be a specific location or attraction that may be useful or interesting to an individual or a group of individuals. By way of example, POIs on a map display might relate to gas stations, hotels, museums, or historical sites in a specific geographic area. A POI may also correspond to movie theatres showing a particular film, or restaurants that serve a specific type of food, such as pizza. Typically, with electronic displays providing POIs, the system or source providing the POI information decides how and where icons or other graphical objects are placed on a map display. In other words, a user has little control over repositioning POI icons and typically can not alter the display of such information, other than possibly turning the display of POI icons on and off.

Examples of devices that provide graphical map displays with POI information include portable navigational devices, mobile phones, and personal digital assistants. There are many drawbacks to such devices when displaying POI icons or similar information on a map display. For example, such conventional devices often have a limited display area, making it difficult to convey POI information along with other information to a user. Many times, a map with icons representing POIs may be cluttered and not easily interpreted when viewed by a user. Further, icons on a map display may overlap each other, making it impossible for the user to distinguish or identify a desired icon. As a result, these and other drawbacks may hinder a user's ability to access needed information. Furthermore, as noted above, conventional devices do not allow a user to reposition icons or isolate certain POIs, thus compounding the problem and restricting the user's ability to easily obtain desired information.

In view of the foregoing, there is a need for proved systems and methods for graphically displaying icons on a map. Preferably, such systems and methods should include the ability to declutter and/or reposition icons, so as to overcome the drawbacks with conventional displays. For example, there is need for systems and methods that declutter icons so that POI and other information may be more effectively conveyed to a user. There is also a need for systems and methods that allow users to change how icons are presented on a map display.

SUMMARY

Embodiments of the present invention include systems and methods for decluttering icons representing, for example, points-of-interest on a map graphically presented on a display. As further disclosed herein, embodiments of the invention may overcome one or more of the disadvantages associated with conventional devices, including with respect to icon cluttering and overlap on map displays.

According to one embodiment, there is provided a method for decluttering icons representing points-of-interest on a map graphically presented on a display. The method may include determining whether icons in a map view are overlapping and grouping the icons which are determined to overlap into at least one icon group. The method may also include repositioning the icons in each icon group into a decluttered icon pattern, wherein the repositioning includes repositioning the icons at a minimum distance from a common focal point.

In accordance with one aspect, the method may also include adjusting the repositioned icons to a different position in the map view when the repositioned icons overlap. Additionally, or alternatively, the method may include repositioning an icon in at least one decluttered icon pattern to a new position in the map view based on input from a user.

Consistent with embodiments of the present invention, there is also provided a method for arranging decluttered icons on a map display. Each of the icons may include a leader line extending between the icon and a position on the map. The method may include receiving input from a user to reposition at least one decluttered icon to a new position on the map. In addition, the method may include repositioning the decluttered icon to a new position on the map, while hiding a leader line to the at least one decluttered icon. The method may further include redrawing the leader line to the repositioned icon after the at least one decluttered icon is repositioned to the new position.

According to another embodiment, a method is provided for decluttering icons on a map graphically presented on display, the icons representing points-of-interest on the map. The method may include determining whether the icons overlap in a map view and grouping the icons which are determined to overlap into at least one icon group. The method may also include repositioning the icons in each icon group in the map view, wherein the repositioning comprises stacking the icons in each icon group into an icon stack. Each icon stack may have a predetermined height and width.

In accordance with an aspect of the method, the method may further include providing, when a user rolls over a stacked icon, a secondary icon in the map view to indicate the original position of the icon. Additionally, the method may include adjusting icon stacks to a different position in the map view when the icon stacks overlap. The method may also include repositioning an icon stack to a new position in the map view based on input from a user.

Consistent with embodiments of the present invention, there is also provided a system for decluttering icons on a map graphically presented on a display, the icons representing, for example, points-of-interest on the map. The system may include means for determining whether the icons overlap in a map view and means for grouping the icons which are determined to overlap into at least one icon group. In addition, the system may include means for repositioning the icons in each icon group into a decluttered icon pattern, such that the icons are repositioned at a minimum distance from a common focal point.

Consistent with an aspect of the invention, the system may also include means for adjusting the repositioned icons to a different position in the map view when the repositioned icons overlap. Additionally, or alternatively, the system may include means for repositioning an icon in at least one decluttered icon pattern to a new position in the map view based on input from a user.

Embodiments of the present invention also relate to instructions created, stored, accessed, or modified by processors using computer-readable storage media and/or computer-readable memory.

It is to be understood that both the foregoing general description and the following detailed description are exemplary and explanatory only and are not restrictive of the invention. Further embodiments and aspects of the invention are described with reference to the accompanying drawings, which are incorporated in and constitute a part of this specification.

These and other embodiments are further explained below with respect to the following figures.

BRIEF DESCRIPTION OF THE DRAWINGS

The following figures are described in the detailed description below.

DETAILED DESCRIPTION

Reference will now be made in detail to one or more exemplary embodiments of the present invention as illustrated in the accompanying drawings to refer to the same or like parts.

Figure 1:
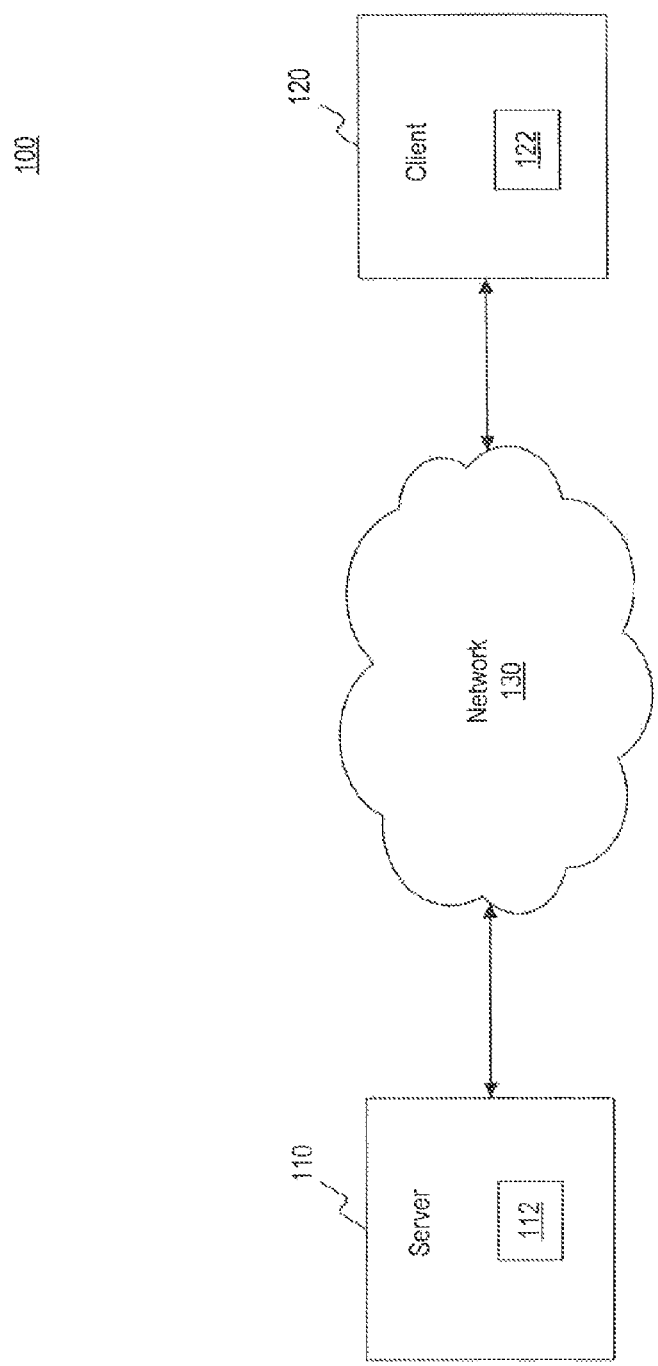
FIG. 1 is a diagram illustrating components of an exemplary system environment for implementing embodiments of the present invention.

FIG. 1 is an exemplary system environment for implementing embodiments of the present invention. In the exemplary system 100 of FIG. 1, client 120 may display icons representing, for example, points-of-interest on a map graphically presented on a display (not shown). Client 120 may receive point of interest information and, more specifically, map data from server 110. However, as will be appreciated by persons skilled in the art, the sending device is not limited to a server, and the receiving device is not limited to a client. For example, peer-to-peer and other relationships may be implemented.

With respect to client 120 and server 110, the receiving and sending devices may be any type of electronic device or component. By way of non-limiting examples, the receiving device (client 120) may comprise a personal computer, a personal digital assistant, a portable navigation device, or a mobile phone. The sending device (server 110) may comprise a server or a collection of servers, alone or in combination with other components such as a global positioning system (GPS). Further, as will be appreciated by persons skilled in the art, the arrangement in FIG. 1 is exemplary and any type and/or number of sending and receiving devices may be utilized to implement embodiments of the present invention. Furthermore, devices other than server 110 and client 120 may be implemented and the functions provided by one or more devices of system 100 may be combined. For example, the functionality of any one or more devices of system 100 may be implemented by any appropriate computing platform or environment.

As shown in FIG. 1, server 110 and client 120 may be connected to and communicate data via a network 130. Network 130 provides communications between the various devices in system 100, such as server 110 and client 120. In addition, server 110 may access legacy systems (not shown) via network 130, or may directly access legacy systems, databases, or other network applications. Network 130 may be a shared, public, or private network, may encompass a wide area or local area, and may be implemented through any suitable combination of wired and/or wireless communication networks. Furthermore, network 130 may comprise a local area network (LAN), a wide area network (WAN), an intranet, or the Internet.

In accordance with certain embodiments, server 110 comprises a computer (e.g., a personal computer, network computer, server, or mainframe computer) having one or more processors (not shown) that may be selectively activated or reconfigured by a computer program. Furthermore, server 110 may distribute data for parallel processing by one or more additional servers (not shown). Server 110 may also be implemented in a distributed network. Alternatively, server 110 may be specially constructed for carrying-out methods consistent with the embodiments disclosed herein.

As shown in FIG. 1, server 110 may include a memory 112. Memory 112 may store, for example, map data and points of interest data. Memory 112 may also store software or components comprising programmed instructions for implementing embodiments consistent with the present invention. Memory 112 may be implemented using conventional hardware such as, for example, one or more of RAM, ROM, magnetic storage, or optical storage.

Client 120 may include a memory 122 for storing program modules that, when executed by a processor (not shown), perform one or more processes such as one or more processes that declutter and/or reposition icons representing points of interest on a map. Memory 122 may comprise one or more memory devices that store data as well as software and may also comprise, for example, one or more of RAM, ROM, magnetic storage, or optical storage.

The program modules stored in memory 122 may be implemented using any form of programming instructions for execution by a processor (not shown). For example, the program modules may be implemented using applets, plug-ins, and/or any other form of software components. In embodiments where server 110 performs processes for icon decluttering and repositioning, program modules and/or other software components may be stored in memory 112.

Figure 2:
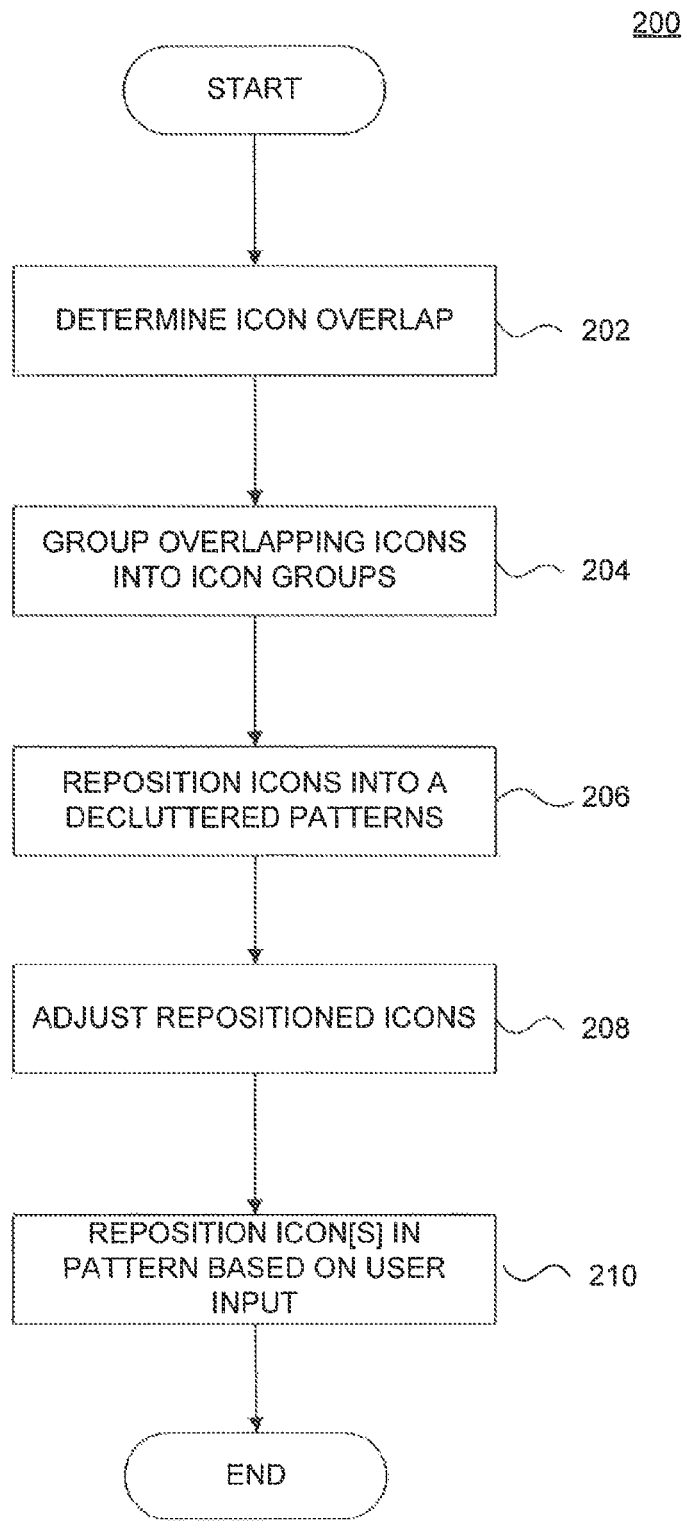
FIG. 2 is a flowchart of an exemplary method for decluttering icons on a map graphically presented on a display, consistent with certain embodiments of the present invention.

FIG. 2 is a flowchart 200 of an exemplary method for decluttering icons on a map graphically presented on a display, consistent with certain embodiments of the present invention. By way of example, the exemplary method of FIG. 2 may be implemented with client 120. In one embodiment, the method described in connection with FIG. 2 is implemented by, for example, program modules or instructions stored in memory 122 of client 120. Client 120 may declutter and reposition icons using data provided from server 110. In other embodiments, server 110 performs the exemplary method of FIG. 2 by communicating data and sending instructions to client 120 (i.e., to declutter or adjust icons graphically presented on a display, to receive user input, etc.). As will be appreciated, the method of FIG. 2 may be adapted for any type of electronic displays, and is not limited to map displays. For instance, other types displays which may make use of embodiments of the invention include schematic diagrams, photographs, blueprints, and scale diagrams.

Figure 5:
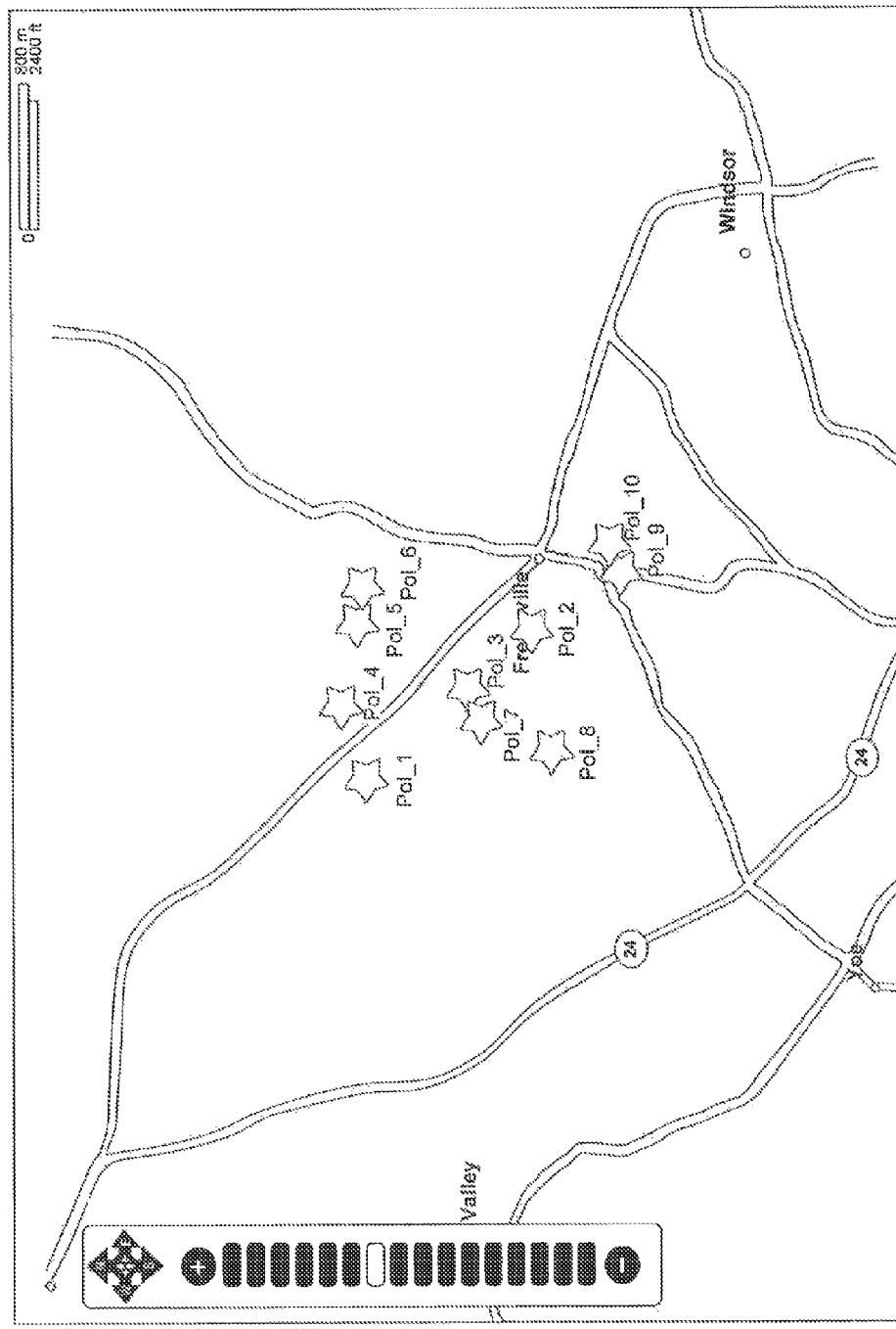
FIG. 5 is a diagram illustrating an example of cluttered icons on a map graphically presented on a display.

At step 202 in FIG. 2, client 120 may determine whether icons presented in a map view overlap. A map view is a portion of the map that is to be graphically presented to a user via a display (i.e., the portion of the map that is displayed and viewable to the user). Icons may be determined to overlap when a graphical representation of an icon in a map view is at least partly covering the graphical representation of at least one other icon in the map view. In one embodiment, client 120 analyzes map and icon data from server 110 to identify all icons that overlap in the map view. By way of example, FIG. 5 illustrates a map view with an exemplary set of icons. The icons may represent points-of-interest or other information to be conveyed to the user. As is evident from the drawing, certain icons overlap in FIG. 5 due to their proximity to one another on the displayed map.

Next, in step 204, the client 120 groups icons which are determined to overlap with one another into icon groups. Each group of icons may be created whenever two or more icons overlap in a map view. For any given map view, there may be one or more icon groups, depending on the number and arrangement of icons. In accordance with one embodiment, each icon group includes a set of icons wherein each icon overlaps with at least one other icon in the set of icons.

In step 206, client 120 may reposition the icons in each icon group into a decluttered icon pattern. The decluttered icon pattern may be any predetermined pattern for decluttering icons. In accordance with one embodiment, the decluttered icon pattern is a pattern that repositions the icons at a predetermined distance from a common focal point. The predetermined distance may be equal to a minimum distance required to place the icons in the icon group in a non-overlapping pattern (e.g., an arc, a circle, etc.) with a common focal point. The common focal point of an icon group may be calculated by client 120 by determining the centroid of a bounding box of the icons in the icon group. The bounding box may define a minimal rectangular domain including all the icons. The distance for the icons to be placed from the common focal point may then be determined by calculating the minimum distance required to place the icons at a equal distance from the focal point without overlapping. In an alternate embodiment of the present invention, the focal point of an icon group may be determined by calculating an average of the latitudinal and longitudinal values of all the icons in an icon group.

The exemplary method of FIG. 2 may end at step 206, with the icons in each icon group being repositioned into a decluttered pattern, if the repositioned icons overlap with any icon in the map view, then client 120 may adjust the repositioned icons to a different position in the map view (see step 208, described below). As discussed below, this may cause the icon decluttering to be performed in an iterative manner. In addition, or alternatively, client 120 may reposition one or more icons (including icons in a decluttered pattern) to a different position in the map view based on input from a user (see step 210, described below).

Consistent with certain embodiments of the invention, client 120 may perform the icon decluttering in an iterative manner. In such a case, client 120 may perform several icon decluttering loops. In an exemplary embodiment, client 120 may perform a maximum number of icon decluttering loops (e.g., up to three decluttering loops). Client 120 may perform each icon decluttering loop on all icon groups contained in a map view.

For purposes of illustration, exemplary embodiments will be described for performing several decluttering loops. In the first loop, client 120 may calculate an angle theta and a line length factor. In accordance with an embodiment, the angle theta may be the angle of spacing between leader lines. The angle theta may be determined based on the number of icons to be decluttered. For example, the value of angle theta, in degrees, may be determined by the following formula:

$$\text{theta} = 360/(\text{number of icons in icon group})$$

The distance between the repositioned icon and the focal point of the icon group may be defined as the line length factor. The line length factor is a default line length. Client 120 may calculate the line length factor by using the calculated value of theta. Theta and the line length factor may be inversely proportional. In an exemplary embodiment, client 120 may optimize the decluttering by using the following formula:

theta*line length factor=1350

Figure 9:
FIG. 9 is a diagram illustrating, by way of example, the decluttered icons of FIG. 8 from a zoomed-out scale, consistent with certain embodiments of the present invention.

The above formula may be used when the icon size is 20×19 pixels. The value of 1350 pixels may be adjusted according to the icon size. In cases where all of the icons in a map view are in a single icon group, client 120 may declutter them using a predetermined pattern, such as an arc or a circle. An example of a single icon group placed in a decluttered, circle pattern is illustrated in FIG. 9.

In an exemplary embodiment, client 120 may position icons in terms of polar coordinates. Polar coordinate define a radius r and an angle theta. In an embodiment consistent with the invention, the center of the polar coordinates may be the focal point of the icon group. The client may then place the decluttered icons at a point (r, theta) from the focal point of the icon group.

In an exemplary embodiment containing a group of n icons, the first icon may be placed at an angle of 135 degrees and a radial distance of the line length factor from the focal point. The next icon may be placed at an angular distance of 135–theta degrees a radial distance of the line length factor from the focal point. Client 120 may continue placing the icons in this manner at a distance of the line length factor from the focal point with an angular separation of theta.

In certain embodiments consistent with the present invention, client 120 may reposition decluttered icons in such a way that prevents overlap with any non-decluttered icons located in the vicinity of an icon group. In such embodiments, when the calculated position for an icon is overlapping with a non-decluttered icon in the vicinity of the icon group, the calculated position may be skipped by client 120. The icon may instead be placed at the next available position.

Consistent with certain embodiments of the invention, client 120 may generate a leader line that is graphically presented as a line drawn from the original icon position to the decluttered icon position in the map view. The leader line may be used to indicate the original position of the icon or underlying information (such as a POI) in relation to the repositioned icon. When all of the icons in the icon group have been repositioned to polar coordinates, client 120 may reposition the icons to the edge of a corresponding leader line. The repositioning of an icon to the edge of a corresponding leader line may dependent upon the shape of the graphical object representing the icon. Icon shapes may include, for example, circles, square, diamonds, stars, or callout balloons. In the example of a circular icon, proper placement may comprise placing the center of the icon on the end of the leader line. In this case of a callout balloon icon, proper placement may comprise positioning the icon so that the leader line is at the tail of the callout balloon.

Client 120 may then determine whether the icons are positioned entirely within the map view on the display. This determination may take into account the size of the icon to verify that the icon is entirely within the map view of the display. When an icon is not entirely within the map view, client 120 may adjust the position of the icon. When it is determined that an icon in the icon group is still cluttered, the icon will retain the decluttered icon position and can be repositioned at the end of the leader line. This may conclude the first icon decluttering loop.

If after the first icon decluttering loop, it is determined that any of the repositioned icons overlap with another icon, then client 120 may enter a second and/or additional icon decluttering loops to adjust the repositioned icons (step 208). As part of this step, client 120 may adjust any repositioned icons which are determined to overlap with other cons. If there are no overlapping icons after the first icon decluttering loop, then client 120 may skip step 208, In such as case, client 120 may proceed to a leader line decluttering process, as further discussed below.

In one embodiment, client 120 may perform the second decluttering loop only on icons which overlap with other icons. At the start of the second decluttering loop, client 120 may calculate the angular distance between the position of each still-overlapping icon and the first decluttered icon placed at 135 degrees from the focal point. This is angle may be referred to as $alpha_n$. After $alpha_n$ is calculated for each still-overlapping icon in an icon group, then the overlapping icons may be repositioned. In an exemplary embodiment, each icon may be repositioned at a radial distance of the line length factor and at angle $alpha_n$ from the focal point of the icon group. After the overlapping icons are repositioned, leader lines from the original icon position to the new decluttered icon positions may be drawn by client 120. Client 120 may then reposition each icon at the edge of a corresponding leader line, as discussed above. This may also include determining that the positions of the adjusted icons are entirely included within the map view of the display. Client 120 then may determine whether any of the adjusted icons overlap any other icons in the map view. When client 120 determines that an overlap still occurs with icons in a icon group and another icon, the icon will not be repositioned at the end of the leader line. Instead, client 120 will conclude the second icon decluttering loop and initiate a third icon decluttering loop. If there are no icons overlapping after the second icon decluttering loop is concluded, client 120 may proceed to the leader line decluttering method, discussed below.

If it is determined that any icons overlap after the second icon decluttering loop is completed, client 120 may perform a third icon decluttering loop on the overlapping icons. At the start of the third icon decluttering loop, client 120 may increment the line length factor for each of the overlapping icons. Client 120 may then reposition the overlapping icons at a radial distance of the incremented line length and at angle $alpha_n$. In one embodiment, the incremented line length may be equal to the original line length factor multiplied by two. After the icons are repositioned, client 120 may determine whether the repositioned icons are entirely within the map view. When client 120 determines the new icon position is not within the map view of the display, client 120 may reposition the icons. In one embodiment consistent with the present invention, icon repositioning may be skipped by client 120 if the repositioning of the icon will place the icon outside of the map view. This may conclude the third decluttering loop. Client 120 may then perform the leader line decluttering method.

Consistent with certain embodiments of the invention, adjusting step 208 may be implemented by client 120 to also analyze and ensure that leader lines for the repositioned icons do not overlap with other leader lines or icons. As with the icon decluttering process, client 120 may perform up to three loops of the leader line decluttering process. Client 120 may perform this process on each icon in an icon group.

As part of the leader line decluttering process, client 120 may first check for any possible intersections between the leader lines which extend from the focal point of the icon group to each icon in the icon group. Client 120 may skip the previous step when the decluttered icon form a full circle pattern (i.e., because in this case there is no overlap between leader lines of icons associated with the same icon group).

When an icon is not a part of an icon group that is being currently decluttered, client 120 may determine if the icon overlaps any other icon or any leader lines. In the case that a leader line is found to overlap any other icon or leader line in the map view, client 120 may place the icon slightly above the original decluttered icon position. In one embodiment, the icon may adjusted by moving the decluttered icon up a distance equal to the height of the icon. When client 120 determines that an overlap still occurs between a leader line and another icon or leader line, client 120 will conclude the first leader line decluttering loop and initiate a second icon decluttering loop. If there is no overlap between the leader lines and other icons or leader lines after the first icon decluttering loop, then client 120 has concluded the icon and leader line decluttering process and no further decluttering loops are executed.

If leader line overlap still occurs, client 120 may continue to a second loop of the leader line decluttering process. As part of this second leader line decluttering loop, client 120 may adjust any repositioned icon where the accompanying leader line has been determined to overlap with other icons or leader lines. In the case that a leader line is found to overlap any other icon or leader line in the map view, client 120 will place the icon slightly below the original decluttered icon position. In one embodiment, the icon may be moved below the decluttered icon position by moving the icon down a distance equal to the height of the icon. When client 120 determines that an overlap still occurs between a leader line and another icon or leader line, client 120 will conclude the second leader line decluttering loop and initiate a third icon decluttering loop. If there is no overlap between the leader lines and other icons or leader lines after the second icon decluttering loop is concluded, client 120 has concluded the icon and leader line decluttering process and no further decluttering loops are executed.

If it is determined overlap still exists between at least one icon and any other icon or leader lines, client 120 will continue to a third leader line decluttering loop. As part of this third leader line decluttering bop, client 120 may again adjust any repositioned icon where the accompanying leader line has been determined to overlap with other icons or leader lines. In the case that a leader line is found to overlap any other icon or leader line in the map view, client 120 will place the icon further below the original decluttered icon position. In one embodiment, the icon may be moved below the decluttered icon position by moving the icon down a distance equal to twice the height of the icon. If there is no overlap between the leader lines and other icons and leader lines after the second icon decluttering loop is concluded, client 120 has concluded the icon and leader line decluttering process. This may conclude the third leader line decluttering loop.

In an exemplary embodiment of the present invention, the overlapping of leader lines and icons is avoided whenever possible. When a decluttered icon cannot be placed without overlapping leader lines or other icons, this rule may be relaxed. That is, if leader line decluttering has been completed, and there are outstanding icons to be decluttered, then the leader lines may overlap non-decluttered icons. In such a case, client 120 may display the icon on top of the leader line in the map display.

After the leader lines of all of the icons have been decluttered or the leader line declutter method has performed all three loops, client 120 may save the original position and the current decluttered position for all of the icons in memory 122.

Referring again to FIG. 2, as part of decluttering and repositioning icons, client 120 may also enable a user to reposition icons based on input provided from the user. The repositioning of icons based on user input, may occur at any time. In the exemplary embodiment of FIG. 2, the repositioning of icons based on user input (step 210) is shown as occurring after steps 202-208. However, as will be appreciated by persons skilled in the art, the exemplary method FIG. 2 is not limited to any precise order and the illustrated steps of FIG. 2 may be performed in alternative ways (e.g., step 210 before step 202 or 208).

In step 210, an icon may be repositioned to a new position in the map view based on input from a user. User input may include, for example, re-sizing the map view, or selecting an icon and dragging the icon to a new position in the map view. In the case of a user dragging an icon to a new position, client 120 may hide the leader line when the user selects an icon and then redraw the leader line when the user drops the icon in a new position. User input may also include selecting the number of icons to be displayed, or turning on or off the display of all icons or only certain categories of icons. In one embodiment, re-sizing the map view may include zooming in, to decrease the area of the map presented in the map view, or zooming out, to increase the area of the map presented in the map view. The repositioning of the icons based on user input may be performed by one or more processors (not shown) of client 120. A user may provide input to client 120 using any conventional device or combination of devices (e.g., mouse, keyboard, menu screen, etc).

Referring again to FIG. 2, step 210 may be repeated any number of times. For example, user input may first include a user selecting an icon and dragging the icon to a new position in the map view. Following this input, a user may then re-size the map view. Consistent with aspects of the present invention, the icons may again be de-cluttered in the re-sized map view. In one embodiment, the icon positioning determined by a user selecting and dragging the icon may be overridden by the subsequent decluttering.

Figure 3:
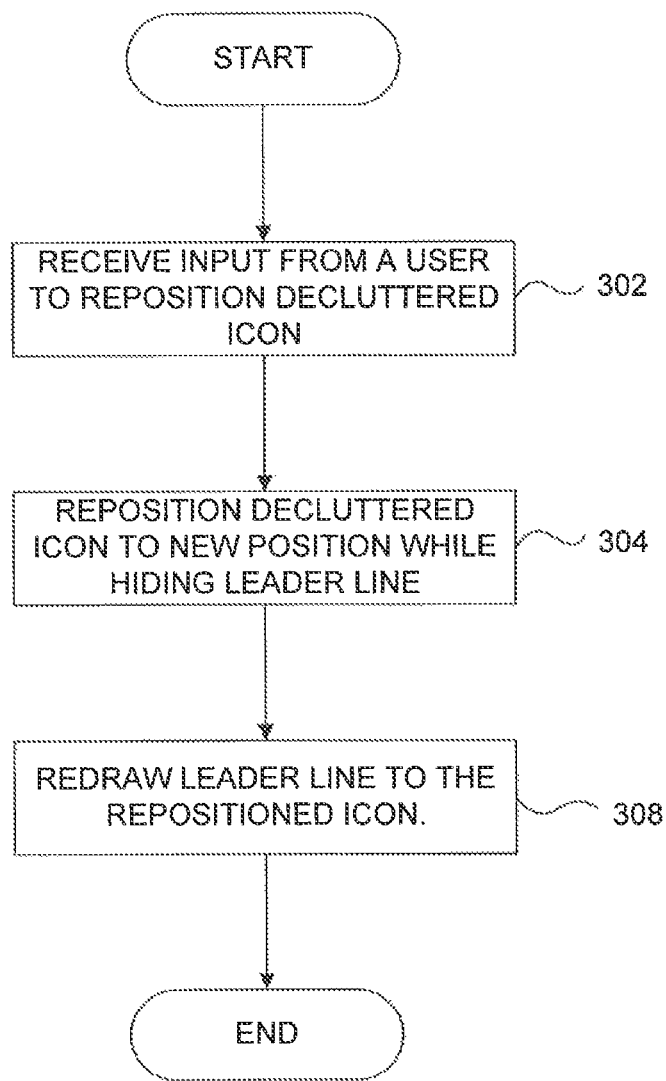
FIG. 3 is a flowchart of an exemplary method for arranging decluttered icons on a map graphically presented on a display, consistent with certain embodiments of the present invention.

FIG. 3 is a flowchart 300 of an exemplary method for arranging decluttered icons on a map graphically presented on a display, consistent with embodiments of the present invention. The exemplary method of FIG. 3 may be performed as part of, for example, step 210 of FIG. 2 or step 410 of FIG. 4. Further, the exemplary method of FIG. 3 may be implemented with client 120 and/or server 110. In the following description, FIG. 3 is described for purposes of illustration with reference to client 120. As will be appreciated, the method of FIG. 3 may be adapted for other types of electronic displays, and is not limited to map displays.

At the start, in step 302, client 120 may reposition at least one decluttered icon to a new position on the map based upon input received from a user. As noted above, user input may include re-sizing the map view, or selecting an icon and dragging the icon to a new position in the map view. Re-sizing the map view may include zooming in, to decrease the area of the map presented in the map view, or zooming out, to increase the area of the map presented in the map view.

Next, in step 304, client 120 may reposition the at least one decluttered icon to a new position on the map based on the input received from the user. The leader lines that extend from the decluttered icon to the original icon position may be hidden and not graphically presented on the display during the icon repositioning.

In step 306, client 120 may redraw the leader lines. The redrawing may occur after the decluttered icon is repositioned to a new position. The redrawing of leader lines may follow the techniques described above in connection leader line decluttering and icon placement at the edge of a corresponding leader line.

Figure 4:
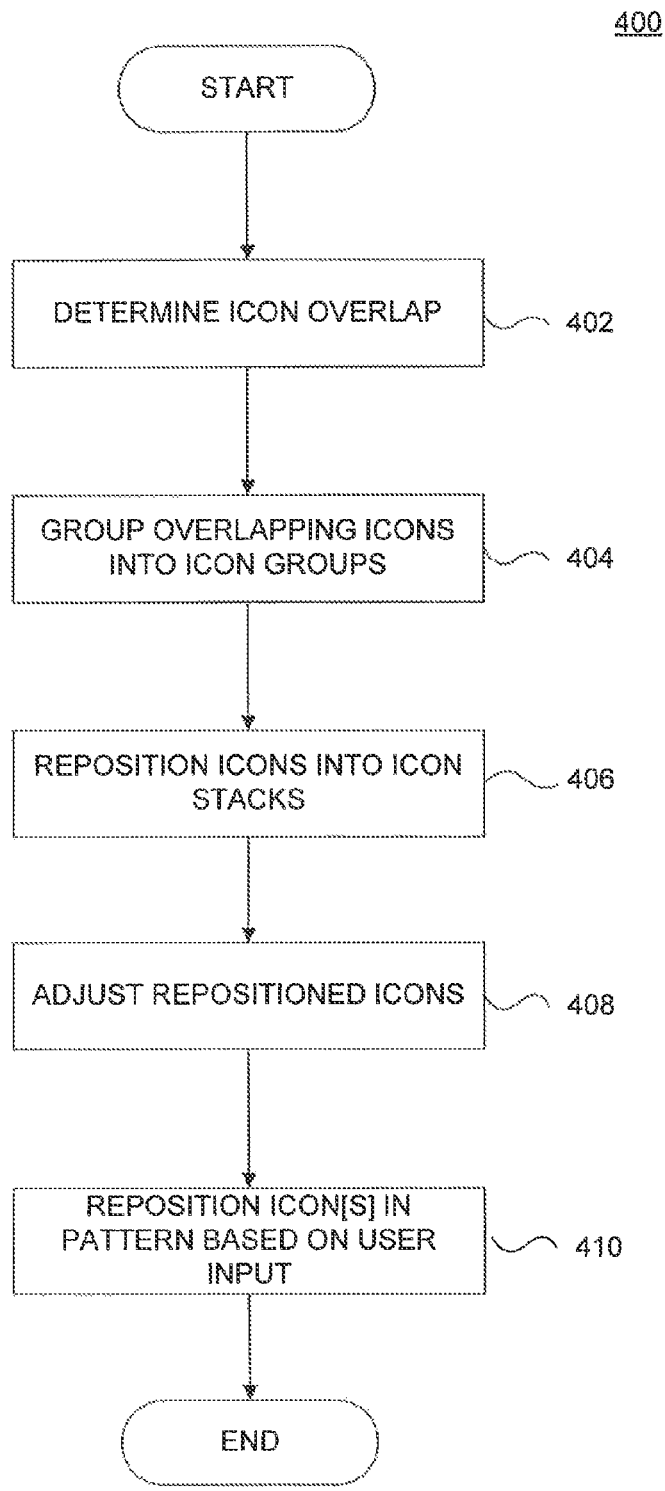
FIG. 4 is a flowchart of an exemplary method for arranging decluttered icons on a map graphically presented on a display, each of the icons including a leader line that extends between the icon and a position on the map, consistent with certain embodiments of the present invention.

FIG. 4 is a flowchart 400 of another exemplary method for decluttering icons presented on a display, consistent with embodiments of the present invention. In this exemplary method, icons are decluttered using reposition the icons into stacks. The exemplary method of FIG. 4 may be implemented by client 120. While the following description of FIG. 4 is made with reference to client 120, it is also possible to perform the exemplary method of FIG. 4 using server 110. In such as case, server 110 performs the exemplary method by communicating data and sending instructions to client 120 (i.e., to declutter or adjust icons graphically presented on a display, to receive user input, etc.). Further, as will be appreciated by those skilled in the art, the method of FIG. 4 may be adapted for other types of electronic displays, and is not limited to map displays.

In step 402, client 120 may determine whether the icons presented in a map view overlap. Icons may be determined to overlap when a graphical representation of an icon is at least partly covering the graphical representation of at least one other icon. In one embodiment, client 120 analyzes map and icon data from server 110 to identify all icons that overlap in the map view. By way of example, FIG. 5 illustrates a map view with an exemplary set of icons, some of which overlap.

Next, in step 404, client 120 may group the icons which are determined to overlap in the map display into icon groups. Each group of icons may be created whenever two or more icons overlap in a map view. For any given map view, there may be one or more icon groups, depending on the number and arrangement of icons. In accordance with one embodiment, each icon group includes a set of icons, wherein each icon overlaps with at least one other icon in the set of icons.

In step 406, client 120 may reposition the icons from each icon group into an icons stack. Consistent with certain embodiments, icon groups may have a predetermined height and width. By way of example, each icon stack may be set to a height of one and a width of three (see, e.g., FIG. 10). As will be appreciated by persons skilled in the art, the dimension of each icon stack may be set to other dimensions and is purely a matter of design choice that may depend on the application, environment, etc. in which embodiments of the invention are implemented.

Embodiments of the invention may enable a user to paginate or search through icon stacks. Such features may be useful where the dimension of the icon stack is smaller than the total number of icons in the icon group that were decluttered into the icon stack. In other words, there may be cases where the icon stack presented in the map view includes graphical objects that are less than the total number of decluttered icons. Assume, for example, an icon stack has a height of one and a width of three. In such a case, only three icons can be graphically represented in the icon stack at any given instant (see, e.g., FIG. 10). If more than three icons belong to the icon stack, then a user may be permitted to paginate or search through the icon stack by clicking and interacting with the icon stack displayed in the map view.

In accordance with one embodiment, if the number of icons is greater than the number of icons that can be displayed in a icon stack, a symbol such as an arrow may be displayed above or adjacent to one or more dimensions of the icon stack. Each arrow may allow a user to scroll through the icons along a column or a row, depending on the total number of icons decluttered in the icon stack. Additionally, or alternatively, a user may roll over a stacked icon to view a secondary icon on the map illustrating the icon's original position. Further embodiments and aspects of the invention concerning icon stacks is presented below with reference to FIG. 10.

Optionally, in step 408, client 120 may adjust repositioned icons in an icon stack to avoid overlapping in a map view. Specifically, repositioning may be performed when icon stacks overlap. Icon stacks may be determined to be overlapping when a graphical representation of an icon in one stack is at least partly covering a graphical representation of at least one icon in another stack. The repositioned icon stacks may be moved to a new position that is not overlapping with over icon stacks or other icons in a map view. Consistent with certain embodiments of the present invention, the decluttering of icon stacks may be performed in an iterative manner to adjust the icon stacks and reduce icon overlap. The loops may be limited (e.g., up to three times) and follow the decluttering techniques disclosed herein for avoiding overlap.

Additionally, or alternatively, in step 410 of FIG. 4 an icon stack may be repositioned to a new position on the map based on input from a user. As noted above, user input may include re-sizing the map view, or selecting an icon stack and dragging the icon stack to a new position in the map view. The repositioning of the icon stack based on the user input may be performed by a processor of client 120.

In one embodiment, repositioning of an icon stack based on user input may be limited (i.e., stacked icons may be essentially static), such that only limited repositioning operations are provided to the user. For example, the user may be permitted to re-size a map, but not reposition an icon stack via a dragging operation.

Referring now to FIGS. 5-10, examples will be provided to further illustrate the various aspects and embodiments of the invention. FIG. 5 is an exemplary representation of a map view with cluttered icons on a map graphically presented on a display. Client 120 may determine the whether icons PoI_1 to PoI_10 overlap. Based on the example of FIG. 5, client 120 may determine PoI_3 and PoI_7 overlap and PoI_9 and PoI_10 overlap, and PoI_5 and PoI_6 overlap. By way of example, this determination step may performed as part of step 202 of FIG. 2. The overlapping icons are grouped, creating three icon groups: Icon_Group 1 (PoI_3 and PoI_7); Icon_Group 2 (PoI_9 and PoI_10): and Icon_Group 3 (PoI_5 and PoI_6), This grouping step may be performed as part of step 204 of FIG. 2.

Figure 6:
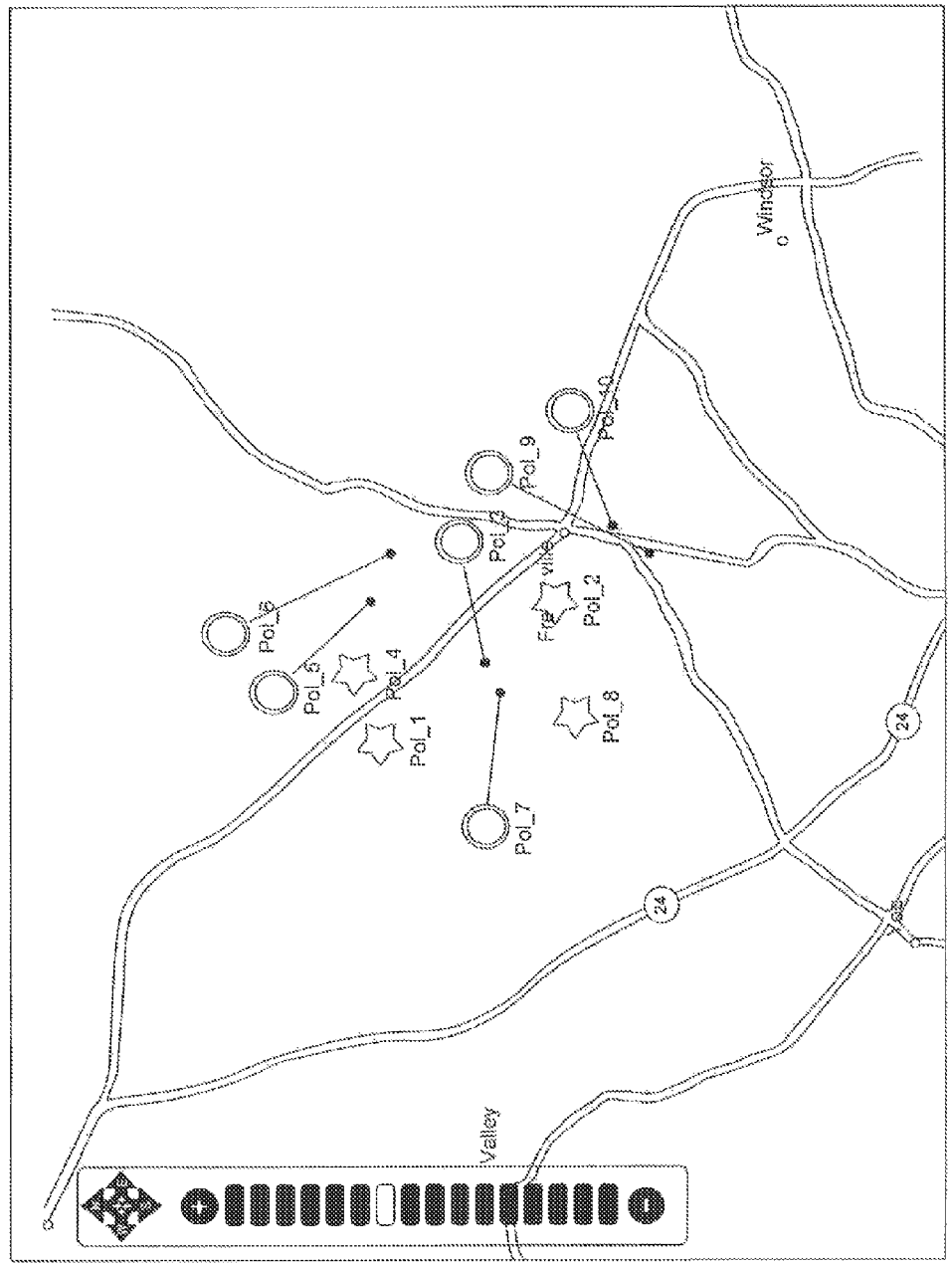
FIG. 6 is a diagram illustrating an example of decluttered icons on a map graphically presented on a display, consistent with certain embodiments of the present invention.

FIG. 6 is an exemplary representation of a map view with decluttered icons PoI 1-10. In the example of FIG. 6, the icon shape is changed for each icon that has been repositioned, consistent with an embodiment of the invention. In this example, client 120 has repositioned the icons in each icon group to form decluttered icon patterns. Icons PoI_3 and PoI_7 are repositioned at a minimum required distance from a common focal point. Further, in the example of FIG. 6, leader lines are drawn that extend from each icon (PoI_3 and PoI_7) to its original position on the map (see original positions in FIG. 5). The repositioning and drawing of leader lines is also performed with respect to the other icon groups, including repositioned icons PoI_9 and PoI_10, and repositioned icons PoI_5 and PoI_6. This repositioning may be performed by client 120 as part of step 206 of FIG. 2.

Figure 7:
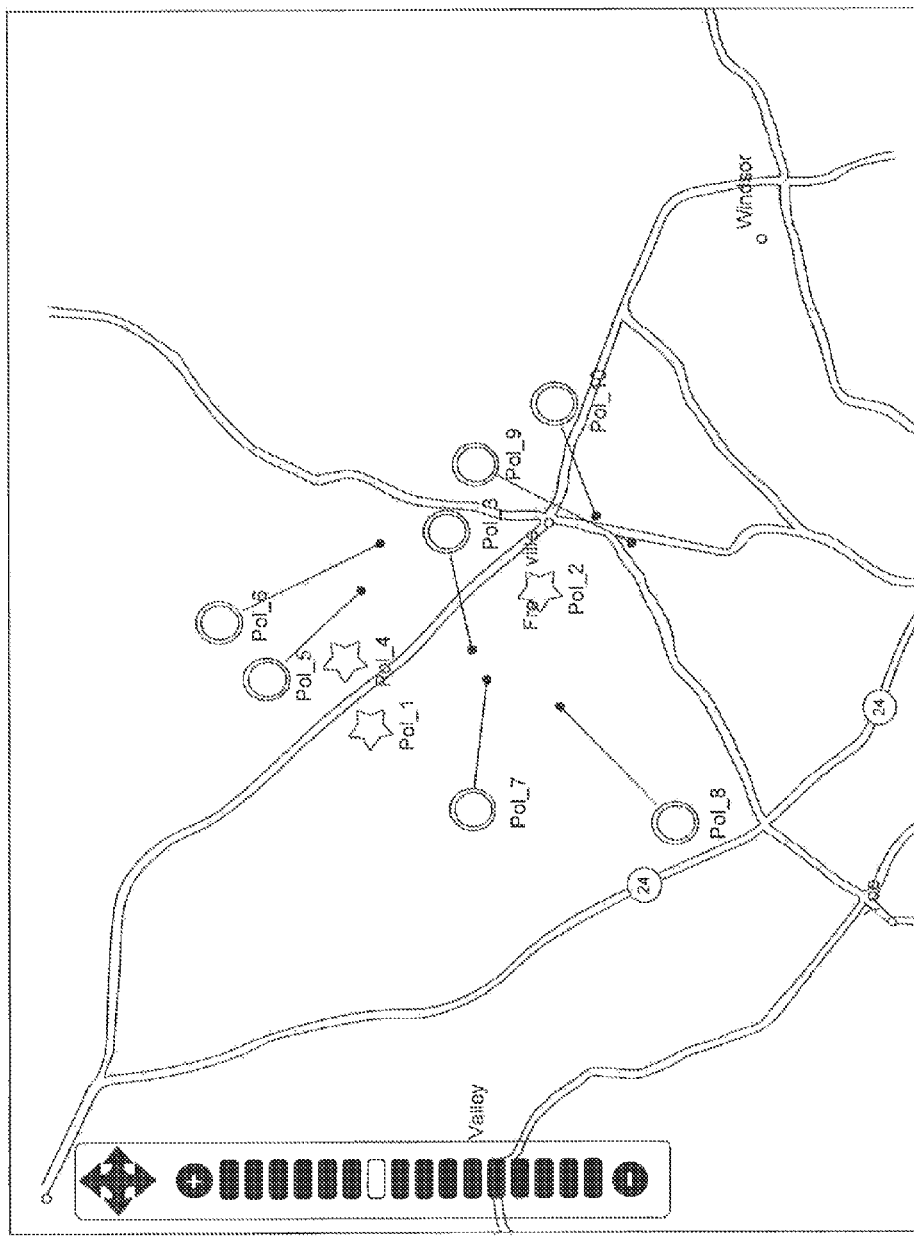
FIG. 7 is a diagram illustrating an example of decluttered icons on a map after repositioning an icon to a new position on the map based on input from a user, consistent with certain embodiments of the present invention.

FIG. 7 is an exemplary representation of a map view in which the position of an icon has been adjusted according to a user's input. Consistent with embodiments of the invention, an icon may be moved to a new position in a map view based on input from a user. The user input may include, for example, a user selecting an icon in the map view, and dragging the icon to a new position in the map view. In the example of FIG. 7, icon PoI_8 is repositioned after it has been dragged to a new location by a user. Further, in this example, a leader line is drawn extending from repositioned icon PoI_8 to its original position on the map (see original position of icon PoI_8 in FIG. 5).

Figure 8:
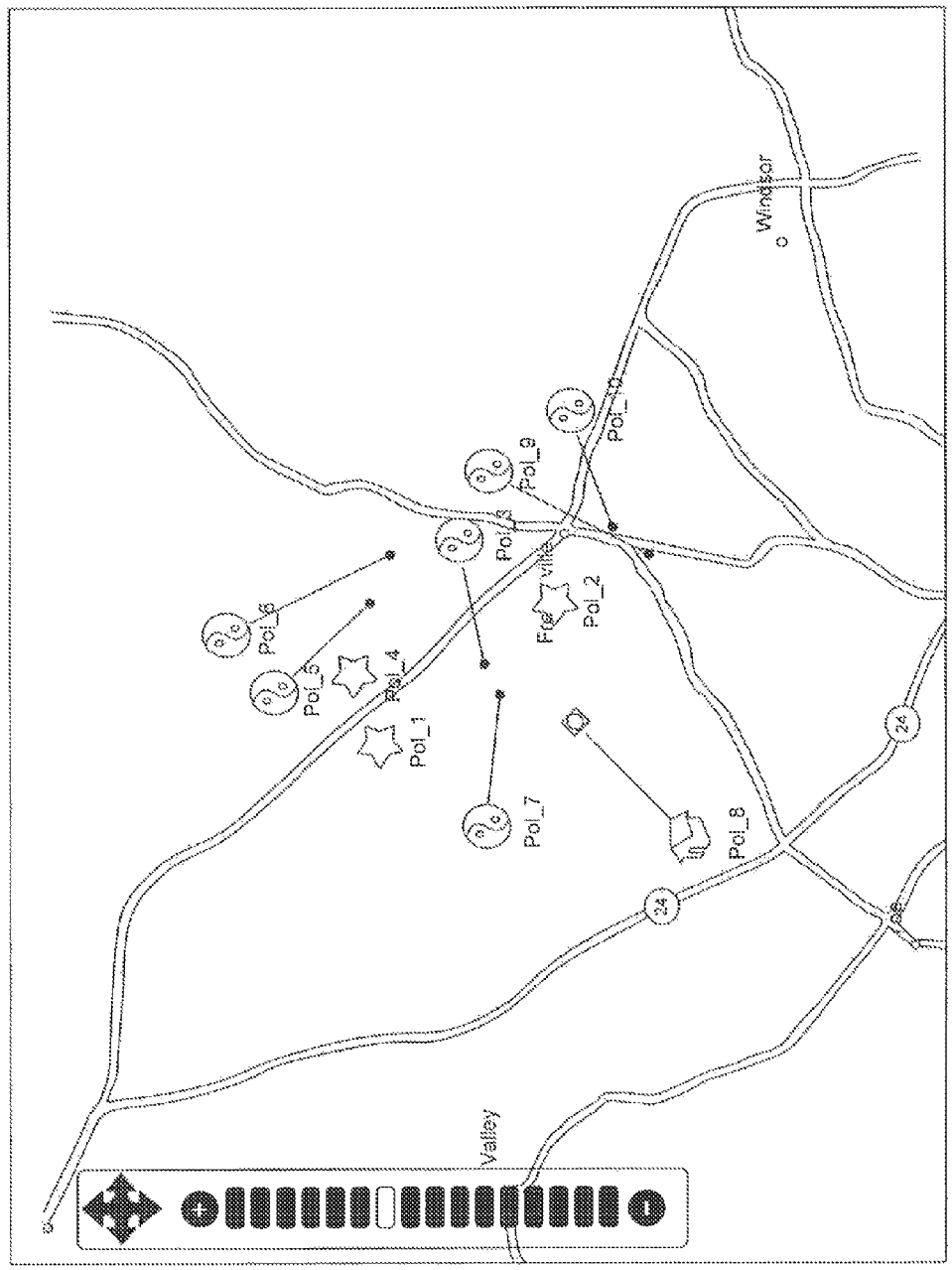
FIG. 8 is a diagram illustrating another exemplary map view in which the appearance of the icons in FIG. 7 have been customized based on a user's input, consistent with certain embodiments of the present invention.

FIG. 8 illustrates another exemplary map view in which the appearance of icons have been customized based on a user's input. In accordance with certain embodiments of the invention, a user may be permitted to customize the images or graphical objects used to represent an icon, such as a point-of-interest icon. A menu, drop-down window or similar input device at client 120 may allow a user to select or enter a variety of icon shapes, colors, and/or sizes. In the example of FIG. 8, the icon for PoI_8 has been customized to a graphical object representing a house. In addition, the icons corresponding to PoI_3, PoI_5, PoI_6, PoI_7, PoI_9, and PoI_10 have been changed to taijitu or "ying-yang" symbols. In an exemplary embodiment of the present invention, a user may set a rule to change all repositioned icons to a different icon by creating a rule for repositioned icons. In such an embodiment, a user may also set a rule that a specific category of icons (such as a particular type or category of POIs) will to always have a special icon, such as the house representing PoI_8 in FIG. 8. In an exemplary embodiment, a user could also adjust the color of the leader lines or the icons. These color adjustments may be performed according to a rule, for example, all leader lines leading from house icons are blue. Alternatively, color adjustments could be set individually.

FIG. 9 illustrates a map view with an exemplary set of icons that are presented in a decluttered pattern. Consistent with certain embodiments of the invention, when all icons in a map view are group into a single icon group, the icons may be decluttered into a predetermined pattern, such as an arc or a circle. In one embodiment, when a map view is presented from a highly zoomed-out scale, all icons are decluttered into a circle pattern with a common focal point. In the example of FIG. 9, client 120 has zoomed-out the map on the display based on user input to increase the area of the map presented in the map view. By changing the map view, client 120 not only has updated the map view, but also initiated a new process of determining overlapping icons and repositioning overlapping icons to eliminate clutter. Consistent with certain embodiments of the invention, these steps may be performed by client 120 every time user input is received. In the example of FIG. 9, prior to the decluttering, icons PoIs_1-10 would have all overlapped in the zoomed-out, map view. Because the icons now form a single icon group, they have a common focal point and are arranged in a circle around the focal point. By way of example, icons could also be placed in other patterns, such as squares, stars, diamonds, or arcs.

Figure 10:
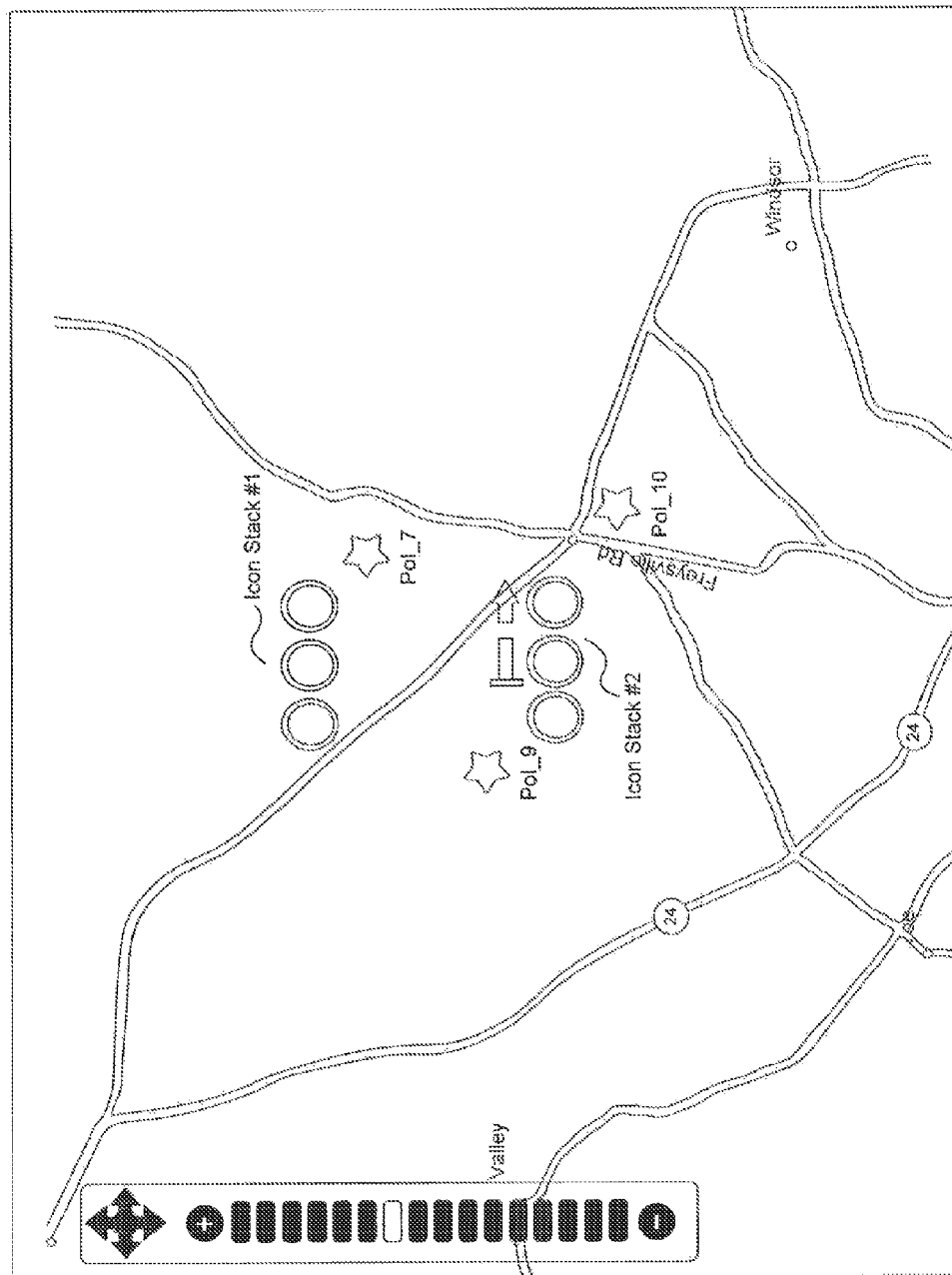
FIG. 10 is a diagram illustrating another example of decluttered icons on a map, consistent with certain embodiments of the present invention.

FIG. 10 illustrates a map view with an exemplary set of icons that are presented in decluttered icon stacks. Consistent with certain embodiments of the invention, when icons in a map view are determined to be overlapping and grouped into icon groups, each icons group may be decluttered into an icon stack (see, e.g., FIG. 4). Each icon stack may have a predetermined height and width, such that the number of icons in a icon stack that are displayed to a user is equal to the height multiplied by the width of the stack. In the example of FIG. 10, two icon stacks (Icon Stack #1, Icon Stack #2) are illustrated, with each icon stack being of a height of one and a width of three. Therefore, the number of stacked icons displayed in the map view is limited to three. Further in Icon Stacks #1 and #2, the decluttered icons that are viewable are graphically represented as circular buttons. Each circular button may correspond to one icon (e.g., a POI icon). As will be appreciated y persons skilled in the art, other types and forms of graphical objects may be utilized for representing icons in an icon stack.

Consistent with certain aspects of the present invention, each icon stack may be placed adjacent to a common focal point of the icon group corresponding to the icon stack. The common focal point of an icon group may be calculated by client 120 by determining the centroid of a bounding box of the icons in the icon group, wherein the bounding box defines a minimal rectangular domain including all the icons. In an alternate embodiment of the invention, the focal point of an icon group may be determined by calculating the average of the latitudinal and longitudinal values of all the icons in an icon group.

Referring again to FIG. 10, because the height and width of Icon Stack #1 and Icon Stack #2 is set to a relatively low number (i.e., height=1; width=3), each icon stack may represent a larger number of icons than actually displayed to the user, in other words, certain icons in the stack may be hidden in the e map view. By way of example, Icon Stack #2 may represent a group of six decluttered icons, but only displays three stacked icons at a time. To access stacked icons that are not displayed in the map view, a user may use the arrow that appears above Icon Stack #2 in FIG. 10. The arrow may appear above the icon stack when a user rolls over an icon in Icon Stack #2. The arrow may graphically indicate the progress of paging or searching through the stacked icons. In an alternate embodiment of the present invention, where an icon stack has a height of two or more, and an additional arrow may appear on the side of the icon stack to further allow a user to page up or down through the icon stack.

When a user pages through an icon stack the attributes of the arrow may change. For example, in FIG. 10, when a user rolls over an icon in the Icon Stack #2, a right arrow may appear above the icon stack indicating more icons are available to a user to the right of the icon stack. When the user reaches the furthest right icon in Icon Stack #2, a left facing arrow may appear (not shown). This left facing arrow may indicate more icons are available to the left of the icon stack and can be searched by the user. The attributes of the arrow above the icon stack may indicate the number of stacked icons that are not displayed in the map view. In the example of FIG. 10, the broken arrow above the middle icon in Icon Stack #2 indicates more than two icons are available to the right of the icon stack. In another embodiment of the present invention, when more icons are available on both the left and the right side of the displayed icon stack, client 120 may present the user with a double sided arrow to allow a user to page to both the left and the right of the icon stack.

When a user rolls over a stacked icon in an icon stack, client 120 may provide a secondary icon in the map view to indicate the original position of the icon. By way of example, icon PoI_9 in FIG. 10 is a secondary icon that appears when a user rolls over the stacked icon representing PoI_9. In this case, secondary icon PoI_9 will only appear when a user rolls over or selects the stacked icon corresponding to PoI_9 in Icon Stack #2.

Consistent with certain aspects of the present invention, the icons in the icon stacks may be represented by any combination of icon shapes and/or colors. The icon shapes and colors may be selected according to user input. The icons may all be represented by the same shape or may each be represented by different shapes. The original icon position in the map view may be represented by an icon of a different shape or color than when the icon is represented in the icon stack. Icon shapes may include, for example, circles, square, diamonds, stars, or callout balloons.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. It is intended that the specification and examples be considered as exemplary only, with a true scope and spirit of the invention being indicated by the following claims.

What is claimed is:

1. A system for decluttering icons presented on a computerized map display, the icons representing corresponding points-of-interest locations on a map, the system comprising:
    a storage medium that stores a plurality of instructions; and
    at least one processor that executes the plurality of instructions to:
        identify icons that would overlap on the map display if displayed at their corresponding points-of-interest locations;
        determine a decluttered icon pattern in which the overlapping icons are repositioned, wherein each of the repositioned icons includes a leader line that extends between the icon and a corresponding points-of-interest location;
        determine whether any of the repositioned icons would overlap in the decluttered icon pattern and, if so, adjust a radial position of one or more of the overlapping icons from a common focal point of the overlapping icon group to eliminate the icon overlap;
        determine that at least two of the leader lines would overlap and adjust an angle of spacing between the overlapping leader lines to eliminate the leader line overlap; and
        cause display on the map display of the decluttered icon pattern reflecting the adjusted one or more icons and including the leader lines extending from the icons in the decluttered icon pattern to their corresponding points-of-interest locations.

2. The system of claim 1, wherein the decluttered icon pattern is one of an arc or a circle.

3. The system of claim 1, wherein the at least one processor further executes the plurality of instructions to provide an information rollover window on the map display for at least one of the icons in the decluttered icon pattern.

4. The system of claim 1, wherein the at least one processor further executes the plurality of instructions to reposition an icon in the decluttered icon pattern to a new position in the map display based on input from a user.

5. The system of claim 4, wherein the input from a user comprises a user request to re-size the map.

6. The system of claim 5, wherein the re-sizing includes zooming in and zooming out.

7. The system of claim 4, wherein the input from a user includes a user selecting an icon in the decluttered icon pattern and dragging the icon to a new position in the map.

8. The system of claim 4, wherein the input from a user includes a user request to display a specified number of icons on the map.

9. The system of claim 1, wherein the angle of spacing between the overlapping leader lines is determined based on the number of icons to be decluttered.

10. A non-transitory computer-readable medium storing instructions for decluttering icons presented on a computerized map display, the icons representing corresponding points-of-interest locations on a map, the instructions being executable by one or more processors to:
    identify icons that would overlap on the map display if displayed at their corresponding points-of-interest locations;
    determine a decluttered icon pattern in which the overlapping icons are repositioned, wherein each of the repositioned icons includes a leader line that extends between the icon and a corresponding points-of-interest location;
    determine whether any of the repositioned icons would overlap in the decluttered icon pattern and, if so, adjust a radial position of one or more of the overlapping icons from a common focal point of the overlapping icon group to eliminate the icon overlap;
    determine that at least two of the leader lines would overlap and adjust an angle of spacing between the overlapping leader lines to eliminate the leader line overlap; and
    cause display on the map display of the decluttered icon pattern reflecting the adjusted one or more icons and including the angularly spaced leader lines extending from the icons in the decluttered icon pattern to their corresponding points-of-interest locations.

11. The non-transitory computer-readable medium of claim 10, wherein the decluttered icon pattern is one of an arc or a circle.

12. The non-transitory computer-readable medium of claim 10, wherein the instructions are further executable by the one or more processors to provide an information rollover window on the map display for at least one of the icons in the decluttered icon pattern.

13. The non-transitory computer-readable medium of claim 10, wherein the instructions are further executable by the one or more processors to reposition an icon in the decluttered icon pattern to a new position in the map display based on input from a user.

14. The non-transitory computer-readable medium of claim 13, wherein the input from a user comprises a user request to re-size the map.

15. The non-transitory computer-readable medium of claim 14, wherein the re-sizing includes zooming in and zooming out.

16. The non-transitory computer-readable medium of claim 13, wherein the input from a user includes a user selecting an icon in the decluttered icon pattern and dragging the icon to a new position in the map.

17. The non-transitory computer-readable medium of claim 13, wherein the input from a user includes a user request to display a specified number of icons on the map.

18. A method for decluttering icons presented on a computerized map display, the icons representing corresponding points-of-interest locations on a map, the method comprising the following operations performed by at least one processor:
    identifying icons that would overlap on the map display if displayed at their corresponding points-of-interest locations;
    determining a decluttered icon pattern in which the overlapping icons are repositioned, wherein each of the repositioned icons includes a leader line that extends between the icon and a corresponding points-of-interest location;
    determining whether any of the repositioned icons would overlap in the decluttered icon pattern and, if so, adjusting a radial position of one or more of the overlapping icons from a common focal point of the overlapping icon group to eliminate the icon overlap;

determine that at least two of the leader lines would overlap and adjust an angle of spacing between the overlapping leader lines to eliminate the leader line overlap; and causing display on the map display of the decluttered icon pattern reflecting the adjusted one or more icons and including the leader lines extending from the icons in the decluttered icon pattern to their corresponding points-of-interest locations.

19. The method of claim 18, wherein the decluttered icon pattern is one of an arc or a circle.

20. The method of claim 18, wherein the method further comprises providing an information rollover window on the map display for at least one of the icons in the decluttered icon pattern.

* * * * *